(12) United States Patent
Fattal et al.

(10) Patent No.: US 9,494,419 B2
(45) Date of Patent: Nov. 15, 2016

(54) BEAM DIRECTION SENSOR

(75) Inventors: David A. Fattal, Mountain View, CA (US); Raymond G. Beausoleil, Redmond, WA (US); Joanna Duligall, Gloucester (GB); Radu Ionicioiu, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 13/260,064

(22) PCT Filed: Jul. 31, 2009

(86) PCT No.: PCT/US2009/052478
§ 371 (c)(1),
(2), (4) Date: Sep. 23, 2011

(87) PCT Pub. No.: WO2011/014194
PCT Pub. Date: Feb. 3, 2011

(65) Prior Publication Data
US 2012/0120390 A1 May 17, 2012

(51) Int. Cl.
*G01J 1/00* (2006.01)
*G01B 11/26* (2006.01)
*G01S 3/784* (2006.01)

(52) U.S. Cl.
CPC ............ *G01B 11/26* (2013.01); *G01S 3/784* (2013.01)

(58) Field of Classification Search
CPC ............ G01D 5/38; G01B 11/26; G01B 11/02
USPC .......................................... 356/121
See application file for complete search history.

(56) References Cited

U.S. PATENT DOCUMENTS

| 4,848,911 | A | * | 7/1989 | Uchida et al. ................. 356/509 |
| 5,151,754 | A | * | 9/1992 | Ishibashi et al. ............ 356/490 |
| 5,493,397 | A | * | 2/1996 | Huber et al. .................. 356/482 |
| 5,602,384 | A | * | 2/1997 | Nunogaki ............ B60H 1/0075 126/573 |
| 5,836,724 | A | * | 11/1998 | Satran et al. ................. 407/104 |
| 6,118,119 | A | * | 9/2000 | Ruschin .................... 250/237 G |
| 6,875,974 | B2 | | 4/2005 | Muesch |
| 7,352,932 | B1 | | 4/2008 | Chang et al. |

(Continued)

FOREIGN PATENT DOCUMENTS

| CN | 1404158 | 3/2003 |
| CN | 1453778 | 11/2003 |

(Continued)

OTHER PUBLICATIONS

European Search Report, EP Application No. 09847935.5, Report dated Nov. 28, 2012.

(Continued)

*Primary Examiner* — Tarifur Chowdhury
*Assistant Examiner* — Isiaka Akanbi
(74) *Attorney, Agent, or Firm* — Patent Law Office of David Millers

(57) ABSTRACT

A direction sensor (200) includes sensor cells (215) that respectively correspond to different directions. Each of the sensor cells (215) includes a light sensor (130, 140) and a grating (120) that couples incident light into the light sensor (130, 140) when the incident light has a specific wavelength and is incident on the grating (120) along the direction corresponding to the sensor cell (215).

17 Claims, 2 Drawing Sheets

(56) References Cited

U.S. PATENT DOCUMENTS

| | | | |
|---|---|---|---|
| 7,466,002 B2* | 12/2008 | Shaffer | H01L 27/1446 257/248 |
| 7,639,355 B2* | 12/2009 | Fattal et al. | 356/301 |
| 8,264,678 B2* | 9/2012 | Souchkov et al. | 356/141.2 |
| 8,390,800 B2* | 3/2013 | Fattal et al. | 356/138 |
| 8,901,480 B2* | 12/2014 | Michiyama | G01J 1/0266 250/216 |
| 9,116,046 B2* | 8/2015 | Fant | G01J 1/44 |
| 9,331,219 B2* | 5/2016 | Zivkovic | H01L 31/0232 |
| 2002/0053635 A1* | 5/2002 | Schroter | G01S 3/784 250/203.1 |
| 2003/0128361 A1* | 7/2003 | Kuroda et al. | 356/400 |
| 2003/0197114 A1 | 10/2003 | Muesch et al. | |
| 2004/0056245 A1* | 3/2004 | Thomas et al. | 257/40 |
| 2005/0025422 A1* | 2/2005 | Magnusson et al. | 385/37 |
| 2007/0237473 A1 | 10/2007 | Chen et al. | |
| 2007/0287075 A1* | 12/2007 | Pforr et al. | 430/5 |
| 2008/0062418 A1* | 3/2008 | Magnusson et al. | 356/307 |
| 2008/0128595 A1* | 6/2008 | Kiesel et al. | 250/214 R |
| 2009/0067774 A1* | 3/2009 | Magnusson | 385/10 |
| 2009/0179993 A1* | 7/2009 | Presura | H04N 5/23248 348/208.1 |
| 2009/0273049 A1* | 11/2009 | Fattal et al. | 257/432 |
| 2009/0310214 A1* | 12/2009 | Brueck et al. | 359/370 |

FOREIGN PATENT DOCUMENTS

| | | |
|---|---|---|
| CN | 1779802 | 5/2006 |
| CN | 2890788 | 4/2007 |
| CN | 101027899 | 8/2007 |
| CN | 101218522 | 7/2008 |
| CN | 101416069 | 4/2009 |
| JP | 2003-114123 | 4/2003 |
| JP | 2003133583 | 5/2003 |
| JP | 2006-030033 | 2/2006 |
| JP | 3929748 | 6/2007 |
| WO | WO-2007117667 | 10/2007 |
| WO | WO-2009/087531 | 7/2009 |
| WO | WO-2010/044943 | 4/2010 |

OTHER PUBLICATIONS

Chen, F. et al., "Incident angle of parallel light measurements based on optical vernier principle" Front. Optoelectron. China (2008) 1(1-2): pp. 192-196.

* cited by examiner

BEAM DIRECTION SENSOR

BACKGROUND

Compact light sensors are known that measure a variety of properties of light beams. For example, a photodiode can measure the intensity of an incident light beam by converting incident light into a signal that has a voltage or current that depends on the intensity of incident light. Photodiodes and similar sensors can also be used with optical filters or separators to separate and measure polarization and spectral components of a light beam. Guided-mode resonance (GMR) filters, for example, have been used in sensors that detect light of a particular frequency. One configuration for a compact GMR filter includes a waveguide layer and a grating layer, which can be fabricated on an integrated circuit chip. The grating layer typically reflects part of an incident light beam, transmits part of the incident light beam, and diffracts part of the incident light beam. The diffracted part enters the waveguide layer, but through further interaction with the grating layer, the light in the waveguide can diffract out and interfere with the transmitted part and/or the reflected part. A GMR filter is generally designed to have a "resonance" such that incident light having a resonant frequency is coupled into the waveguide structure with high efficiency, causing the diffracted part of the light to destructively interfere with the reflected part and/or the transmitted part, changing the overall transmission/reflection properties of the structure dramatically around the resonant frequency. For instance a grating layer which, prior to being patterned, would mostly transmit light, becomes highly reflective around the resonant frequency when the holes are indeed present. However, incident light at a non-resonant frequency is not significantly coupled into the waveguide and continues to be transmitted through the grating. Accordingly, resonance gratings can be used as optical filters.

Compact light sensors are also known that measure relative characteristics of a beam. For example, an array of photodiodes or other light sensors can measure the position of a light beam relative to the sensor array simply by determining which sensor or sensors in the array detect light from the beam. Such measurements are useful in alignment systems. In particular, if the sensors detecting a light beam are away from a target location on the sensor array, an alignment system can provide a warning regarding the alignment of the light beam or can actively shift the light source or the sensor array to improve alignment. Incidence angle sensors can also be useful in alignment systems, but a typical solution for measuring the incidence angle of a light beam requires optical elements such as cube corner reflectors that are not easily miniaturized to the sizes of integrated circuits.

BRIEF DESCRIPTION OF THE DRAWINGS

Use of the same reference symbols in different figures indicates similar or identical items.

DETAILED DESCRIPTION

In accordance with an aspect of the invention, GMR filters in an array of sensor cells can be tuned for different incident directions, so that the GMR filters extract light of a specified frequency from incident light if the light is incident at respective directions to which the GMR filters are tuned, (As used herein, the term "light" is not limited to visible light but should be interpreted broadly to include electromagnetic radiation of any frequency that the sensors described herein can detect.) This can be done for instance by changing the grating spatial period $\Lambda$, which is related to the resonant wavelength $\lambda$ and the incidence angle $\theta$ by the formula: $\lambda/\Lambda = n_{eff} \pm \sin\theta$. Here, $n_{eff}$ is the effective index of refraction of the guided mode. When an incident beam of the specified frequency simultaneously illuminates all of the GMR filters in the array, the beam can be identified as being incident at one of the different directions if the GMR filter corresponding to that direction extracts light from the incident beam. The GMR filters and light sensors respectively associated with the GMR sensors can be integrated as part of an angle or direction sensor on an integrated circuit chip. Such a direction sensor can measure a range of directions corresponding to the different GMR filters in the angle sensor simply by determining which GMR filter extracts light, and since the GMS filters provide narrow band extractions, measurement resolutions less than about 1° can be achieved. The measurement range of an angle sensor can be expanded by mounting the direction sensor on a platform that can be tilted to a coarsely aligned orientation so that the angle of incidence of the light beam is within the measurement range of the direction sensor. The measured direction will then depend on the angular position of the platform and the direction associated with the GMR filter or filters that extract light from the incident beam.

Figure 1:
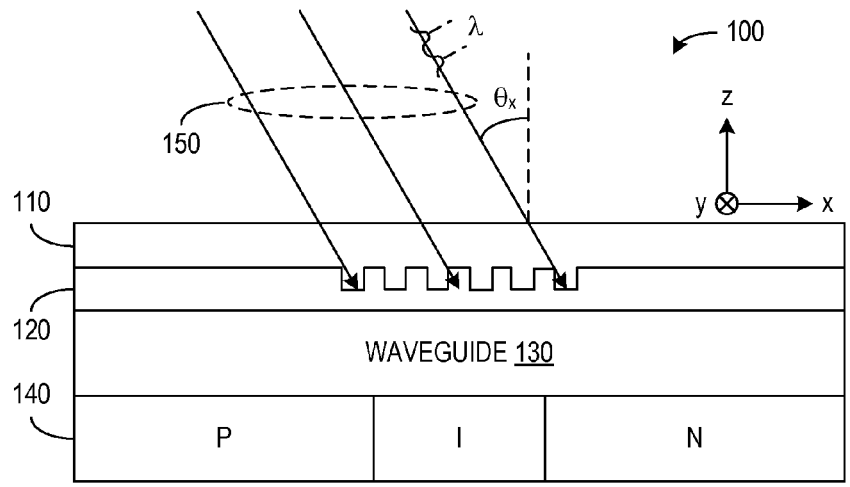
FIG. 1 shows a cross-sectional view of a directional sensor in accordance with an embodiment of the invention capable of sensing whether a light beam of a known wavelength is incident at a target angle.

FIG. 1 illustrates a directional sensor 100 in accordance with an embodiment of the invention. Directional sensor 100 includes a cover layer 110, a grating layer 120, a waveguide layer 130 underlying grating layer 120, and a photodiode layer 140 underlying waveguide layer 130. In an exemplary embodiment of the invention, directional sensor 100 and layers 110, 120, 130, and 150 can be fabricated in and on an integrated circuit chip using known integrated circuit fabrication techniques. The order and arrangement of layers 110, 120, 130, and 140 in FIG. 1 illustrate an example, but alternative arrangements are possible.

In directional sensor 100, cover layer 110 is a protective layer and can be made of a material such as silicon dioxide but may additionally include an antireflective coating to prevent reflection at a top surface of directional sensor 100 or a band-pass optical filter to select the wavelength of light reaching grating layer 130. Other types of filters or coatings may similarly be applied in or on cover 110. Alternatively, cover 110 can be omitted, making grating layer 120 the top layer of directional sensor 100.

Grating layer 120 is made of a material having a refractive index that is higher than the refractive index of cover layer 110 (or of air if cover layer 110 is omitted.) Grating layer 120 may, for example, be made of silicon nitride when cover layer 110 is made of silicon dioxide. As described further below, grating layer 120 has a pattern that causes directional sensor 100 to have a resonance such that incident light 150 is strongly coupled into waveguide 130 only if the wavelength λ and direction of incident light 150 satisfy specific conditions. The peak and quality of the resonance, which affects the range of angles and wavelengths that are strongly coupled into waveguide 130, can be controlled through the design of the grating layer 120. More specifically, the area of the diffractive portion of grating layer 120; the magnitude of the changes in refractive indices of cover layer 110, grating layer 120, and waveguide layer 130, and the height and widths of diffractive features (e.g., holes, lines, or plateaus) in the diffractive portion of grating layer 120 can be selected to provide the peak resonant frequency and the width of the resonance. In general, the specific design of grating layer 120 will depend on the selected wavelength and incident direction of light to be detected and may be produced using GMR filter design techniques that are known in the art.

Waveguide layer 130 contains a core that is intended to guide light of the specific wavelength λ that directional sensor 100 measures. In particular, if the wavelength λ of the light guided is in the infrared range, waveguide layer 130 may contain a core made of silicon or another material that is transparent to infrared light and cladding of a material such as silicon dioxide or silicon nitride that has a lower refractive index than does the core material. For visible light, the core in waveguide layer 130 may be made of silicon nitride and have cladding of silicon dioxide. However, waveguides are well known structures, and waveguide layer 130 could alternatively contain many other types of materials or waveguide structures, which are known or may be developed.

Photodiode layer 140 contains a sensor that is positioned to measure light that is coupled into the core of waveguide layer 130. In the illustrated embodiment of the invention, photodiode layer 140 contains a p-i-n photodiode, but the illustrated photodiode can be replaced by any device capable of measuring the presence or more preferably the intensity of light in waveguide layer 130. For example, a p-n diode or a charge coupled device might be employed in place of the p-i-n photodiode of FIG. 1. Additionally, sensor 140 may contain multiple photodiodes or other sensors that measure the light coupled into the same waveguide in waveguide layer 130. In an alternative embodiment from that shown in FIG. 1, one or more photodiodes or other light sensors can be fabricated in the same layer as the core of the waveguide, that is in waveguide layer 130, instead of being under the waveguide core as shown in FIG. 1. Other configurations of light sensors including but not limited to placing the sensor at an end of the waveguide are possible.

During operation of directional sensor 100, a light beam 150 to be measured is incident on directional sensor 100 at an angle relative to the normal to a surface of directional sensor 100. Incident light beam 150 is preferably a monochromatic beam, and in one embodiment of the invention, light beam 150 may be created by a beam source (not shown) such as a monochromatic laser that is used with directional sensor 100 in an alignment system. Alternatively, an optical filter (not shown) can be employed at or above grating layer 120 to ensure that incident beam 150 is a nearly monochromatic beam of wavelength λ when diffracted. As described further below, directional sensor 100 can measure light from incident beam 150 having a selected or design wavelength of directional sensor 100 if the direction of incident beam 150 satisfies specific conditions, e.g., has a direction corresponding to a resonance coupling of light into directional sensor 100. However, directional sensor 100 may also be capable of measuring incident beams of other wavelengths, but in general, direction or angle measurements may require correction for the difference in incident light wavelength and the selected wavelength for directional sensor 100. For example, for a grating with a spatial period Λ and an effective refractive index $n_{eff}$, the wavelength λ and the incidence angle θ are related by the formula:

$$\frac{\lambda}{\Lambda} = n_{eff} \pm \sin\theta.$$

In general, the direction of incident beam 150 is defined by two angular degrees of freedom, for example, an incidence angle θ and an azimuthal angle φ. Alternatively, if the normal to the surface of directional sensor 100 corresponds to a z axis and the plane of FIG. 1 corresponds to an x-z plane, projection angles $\theta_x$ and $\theta_y$, which are the angles between the z axis and projections of beam 150 respectively onto the x-z plane and the y-z plane, define the direction of incident beam 150. In one configuration, grating layer 120 has a two-dimensional pattern such that grating layer 120 only efficiently couples light of wavelength λ into waveguide 130 (e.g., has resonant coupling behavior) if the direction of beam 150 has a specific direction corresponding to specific resonance peak values $\theta_{xr}$ and $\theta_{yr}$ of projection angle $\theta_x$ and $\theta_y$. The resonance peak angles $\theta_{xr}$ and $\theta_{yr}$ can be controlled through selection of the spatial periods $\Lambda_x$ and $\Lambda_y$ of the grating pattern along x and y directions in the plane of the grating layer. Alternatively, grating layer 120 can have a one-dimensional pattern such that grating layer 120 only efficiently couples light of wavelength λ into waveguide 130 if the direction of beam 150 has one projection angle $\theta_x$ or $\theta_y$ equal to a specific resonance peak value $\theta_{xr}$ or $\theta_{yr}$, while a range of values are permitted for the other projection angle $\theta_y$ or $\theta_x$. With a one-dimensional grating pattern, the lines or grooves in the grating layer are parallel to the axis for which a wide range of angles can be at resonance. In still other alternative configurations, the pattern of grating layer 120 can put other restrictions on the direction of beam 150 required for efficient coupling into waveguide 130.

Grating layer 120 in an exemplary embodiment of directional sensor 100 has a pattern such that resonant coupling of light from incident beam 150 of wavelength λ to waveguide 130 only occurs if the direction of incident beam 150 has projection angles $\theta_x$ and $\theta_y$ within narrow bands (e.g., within about 0.1° to 1°) around specific resonance peak values $\theta_{xr}$ and $\theta_{yr}$. Accordingly, when incident beam 150 has wave length θ, directional sensor 100 can detect whether or not beam 150 has a direction corresponding to resonant projection angles $\theta_{xr}$ and $\theta_{yr}$ by determining whether or not photodiode 140 measures a threshold level of light in waveguide 130. However, if incident beam 150 has a different wavelength λ', a strong coupling of light into waveguide 130 can still occur when beam 140 has a direction corresponding to projection angles $\theta_{xr}'$ and $\theta_{yr}'$, where the difference between projection angles $\theta_{xr}'$ and $\theta_{yr}'$ and projection angles $\theta_{xr}$ and $\theta_{yr}$ depend on the difference between wavelength λ' and λ. Accordingly, directional sensor 100 can be used to detect direction of beams of different wavelengths, but the direction detected depends on the wavelength of the light.

Directional sensor 100 can be fabricated as part of an integrated circuit device including other active devices (e.g., other directional sensors) or as a stand alone device. One fabrication process uses conventional semiconductor processing techniques to form a p-i-n diode in a semiconductor substrate or layer that constitutes photodiode layer 140. At this time, conductive traces and active circuitry may be formed in the semiconductor structure to provide signal output from the photodiode and to create circuitry that may be used with directional sensor 100. Waveguide layer 130 can then be formed on the underlying semiconductor structure by depositing a layer of cladding material (e.g., $SiO_2$), forming a patterned layer of core material (e.g., $Si_3N_4$), and covering the patterned core layer with further cladding material. Typically, for visible light, waveguide layer 130 would be about 200 nm thick and have line widths of about 200 nm (or 400 nm period), but the dimensions of waveguide layer 130 more generally depend on the wavelength of light selected for measurement by directional sensor 100. Grating layer 120, which is formed on waveguide layer 130, is a layer of material (e.g., $Si_3N_4$) having a refractive index that differs from the material (if any) to be used in the cover layer 110. Grating layer 130 can be formed by depositing a layer of the desired material and then patterning the layer using an etch process. The etch process can form holes through grating layer 120 to create diffractive features or a controlled or timed etch process can control the depth of features formed in grating layer 120. A patterned deposition or imprint techniques might alternatively be used for fabrication of grating layer 120. Optionally, cover layer 110 is deposited on grating layer to protect the underlying structure.

Figure 2:
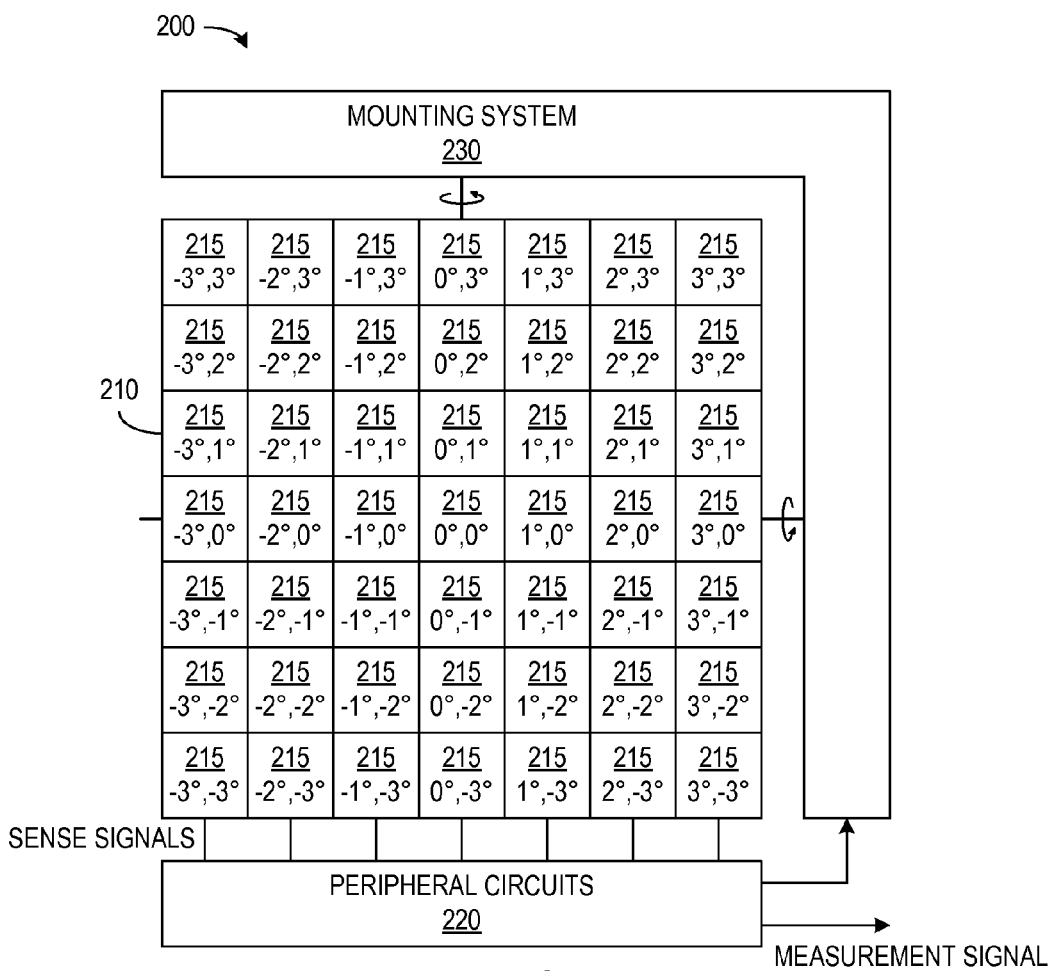
FIG. 2 shows a layout of a direction sensor in accordance with an embodiment of the invention using directional sensors of the type illustrated in FIG. 1 as cells in a sensor array.

In accordance with a further aspect of the invention, a sensor array containing multiple directional sensors of the type illustrated in FIG. 1 can be used to measure the direction of an incident beam. FIG. 2, for example, illustrates a direction measurement system 200 in accordance with an embodiment of the invention. Measurement system 200 includes an array 210 containing rows and columns of sensor cells 215. Each sensor cell 215 can be of the same type as directional sensor 100 of in FIG. 1, but sensor cells 215 have different patterns for their respective grating layers. For example, the combination of size and orientation of the grating layer in each sensor cell 215 differs from the combinations of size and orientation of the grating layers in other sensor cells 215. FIG. 2 shows the examples where each sensor cell 215 has a different two-dimensional grating pattern and a resonant coupling for light incident from a different direction, i.e., a different combination of projection angle values $\theta_x$, and $\theta_y$. For example, in FIG. 2, columns of sensor cells 215 in array 210 cover a range of values for projection angle $\theta_x$ from −3° to 3° in steps of 1° for a specified incident wavelength, and rows of sensor cells 215 in array 210 cover a range of values for projection angle $\theta_y$ from −3° to 3° in steps of 1° for the specified incident wavelength. More generally, the measurement range of direction sensor 200 could be extended by using a larger array of sensor cells 215 providing a greater number of different resonant directions, and a finer measurement resolution (e.g., down to 0.1° or less) can be achieved using smaller steps between the directions corresponding to resonance peaks of sensor cells 215. The widths or Q-factors of the resonances for sensor cells 215 are generally selected according to the size of the steps between resonant directions of different sensor cells 215. When an incident beam of the selected wavelength simultaneously illuminates all sensor cells 215, the photodiode in a sensor cell 215 that contains a grating pattern corresponding to a direction closest to the direction of the incident beam will measure light.

Peripheral circuits 220, which are coupled to sensor cells 215, can detect which sensor cell (or cells) 215 sense light and based on the sense signals from sensor cells 215 produce a measurement signal indicating the direction of the light incident on array 210. In one embodiment of the invention, the resolution of each sensor cell 215 is such that in many cases only one of the sensor cells 215 will detect a light and produce a sense signal with an output voltage or current above a threshold level when the incident beam direction is within the measurement range that sensor array 210 provides. When only one sensor cell 215 produces a sense signal above the threshold level, the measured direction of the incident light beam relative to the normal of sensor array 210 will be the direction corresponding to the resonance of the sensor cell 215 producing the sense signal, and peripheral circuits 220 can include a decoder circuit that generates a measurement signal representing the direction corresponding to the sensor cell at resonance. However, in some cases, e.g., when the incident direction is near halfway between the resonant directions of two or more sensor cells 215, multiple sensor cells 215 may produce sense signals above the threshold level. In such cases, peripheral circuits 220 can identify which sensor cell 215 produces the strongest sense signal and generate a measurement signal corresponding to the resonant direction of the sensor cell 215 producing the strongest sense signal. Alternatively, when multiple sensor cells 215 produce sense signals above a noise level, peripheral circuits 220 can use the sense signals from sensor cells 215 in an interpolation process that determines a measured direction and the measurement signal. In general, digital or analog interpolation circuitry is more complex than decoder circuitry that produces a measurement signal by identifying the strongest signal from sensor cells 215, but interpolation may be able to provide more precise measurements.

In an alternative embodiment, array 210 can be designed so that for any direction within the range of array 210, multiple sensor cells 215 will produce sense signals with voltages or currents above a threshold level (e.g., above a noise threshold). In particular, each sensor cell 215 can have a resonance with a width that significantly overlaps the resonances of one or more other sensor cells 215, so that the direction of a beam will be within resonance of multiple sensor cells 215 having different resonance peaks. The direction of a beam can then be determined as described above either by identifying the sensor cell 215 that produces the strongest signal or using interpolation techniques.

Measurement array 210 is illustrated as an example of one array configuration but many other configurations are possible. For example, sensor cells 215 that detect incident light with similar directions are near each other in array 210, but the same measurement abilities could be achieved with sensor cells 215 in any arrangement. Further, although array 210 of FIG. 2 is a two-dimensional or rectangular array, sensor cells 215 would work equally well in a linear, hexagonal, or other arrangement provided that all sensor cells 210 are illuminated with the incident light. Also, although sensor cells 215 in array 210 cover a range of projection angles in equal steps, the incident directions detected are not required to be in uniform steps or based on the projection angles, and the Q-factor or quality of the resonances are not required to be uniform. For example, step sizes and resonance widths at larger angles could be larger to cover a wider range of directions. In yet another variation, sensor cells 215 could correspond to a range of the incidence angle $\theta$ and a range of azimuthal angle $\phi$.

FIG. 2 also illustrates how the range of angle measurements provided by system 200 can be expanded beyond the range of array 210 using a mounting system 230 capable of tilting array 210. Mounting system 230 may, for example, include three actuators (not shown) on which array 210 rests. The lengths of the actuators can then be electrically changed to tilt array in range of directions that depends on the range of motion of the actuators. Mounting system 230 can be used, for example, to search for an orientation of array 210 such that the incident beam is within the range of incident directions that array 210 can measure. This can be done, for example, by tilting array 210 in different directions until one or more of sensor cells 215 detect light. In the illustrated embodiment, peripheral circuits 220 is connected to mounting system 230 and may contain control circuitry for operation of mounting system 230. In an embodiment where sensor cells 215 that correspond to larger angles have wider resonances, the control circuitry in peripheral circuits 220 can cause mounting system 230 to tilt array 210 so that the incident beam has a direction that is close to a direction for which array 210 can most precisely measure angles, i.e., to a direction where the sensor cells 215 that detect light from the incident beam are closely spaced in angle and have the narrowest resonances.

Array 210 and peripheral circuits 220 can be integrated together on the same integrated circuit chip or monolithic structure. An integrated array 210 and peripheral circuits 220 can be formed using the techniques as described above for directional sensor 100, but in general, the patterns of the grating layers in sensors cells 215 will differ from one sensor cell 215 to the next. Instead of integrating peripheral circuits 220 on the same chip as sensor array 210, some or all of the functions and structures peripheral circuits 220 described above, such as interpolation or control of mounting system 230, can be implemented in an off-chip device such as a microcontroller for a larger system using direction measurement system 200.

Figure 3:
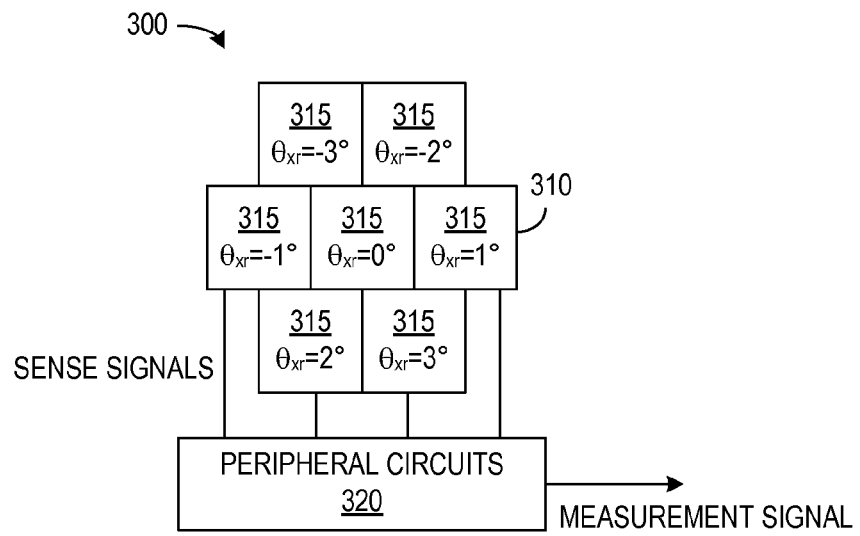
FIG. 3 shows a layout of an angle sensor in accordance with an embodiment of the invention using directional sensors containing one-dimensional gratings.

Direction or angle sensors in accordance with some alternative embodiments of the invention employ directional sensors that have one-dimensional grating patterns. A light beam tilted parallel to the grooves in a one-dimensional grating pattern will have a slow shift in resonance, while a beam tilted perpendicular to the grooves will have a fast shift in resonance. As a result, a set of directional sensors containing one-dimensional gratings can be used to measure an angle (e.g., $\theta_x$ or $\theta_y$) corresponding to a single degree of freedom of the direction of an incident beam. FIG. 3, for example, shows a sensor 300 containing an array 310 of directional sensors 315, where each directional sensor 315 has a grating pattern corresponding to a different value of the projection angle $\theta_x$. Directional sensors 315 are wide band detectors for variations in projection angle $\theta_y$. When a collimated light beam is incident across the area of array 310, the directional sensor 315 having a resonant angle θxr closest to the corresponding angular component of the direction of the incident beam will produce the strongest sense signal. A peripheral circuit 320 can then provide a measurement signal based on the sense signals using the techniques described above.

Figure 4:
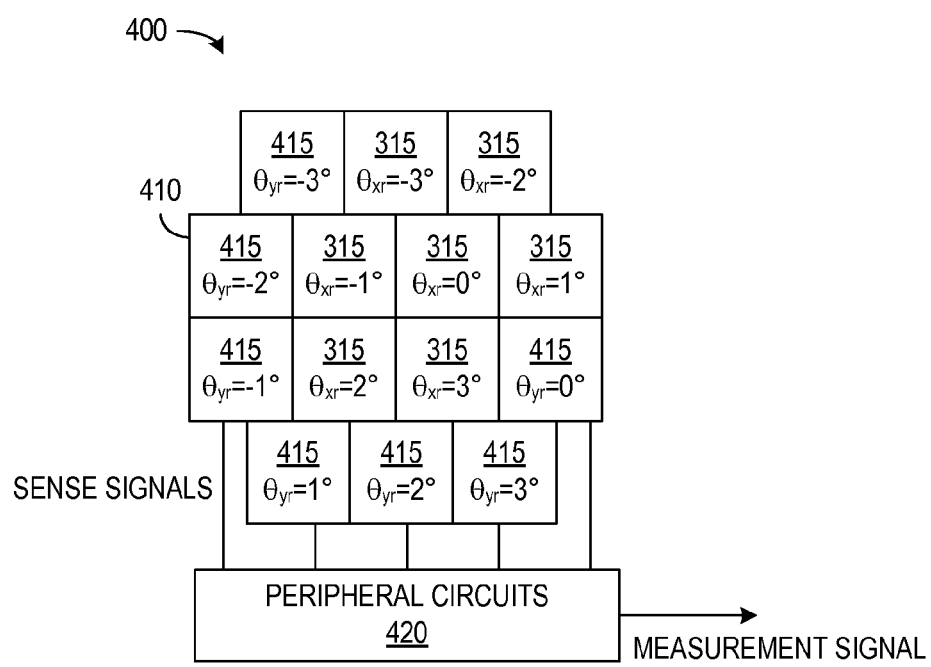
FIG. 4 shows a layout of a direction sensor in accordance with an embodiment of the invention using directional sensors containing one-dimensional gratings.

Use of directional sensors with one-dimensional gratings can also reduce the number of directional sensors needed to measure both angular components of the direction of a collimated beam. FIG. 4, for example, illustrates a direction sensor 400 including an array 410 containing two types of directional sensors 315 and 415. Directional sensors 315 have one-dimensional grating patterns along a first axis, e.g., the y axis, in order to measure projection angle $\theta_x$. Directional sensors 415 have one-dimensional grating patterns along a second axis that is perpendicular to the first axis, e.g., along the x axis in order to measure projection angle $\theta_y$. When a beam having a direction with in the measurement range of array 410 is incident across the area of array 410, a peripheral circuit 420 can identify which of directional sensors 315 generates the strongest sense signals and which of directional sensors 415 generates the strongest sense signals. Peripheral circuits 420 can then generate a measurement signal indicating a value of projection angle $\theta_x$ based on the sense signals and the values of resonant angles θxr of directional sensors 315 and a value of projection angle $\theta_y$ based on the sense signals and resonant angles $\theta_{yr}$, of directional sensors 415. In general, the total number of directional sensors 315 and 415 that direction sensor 400 requires to provide the same range and resolution as direction sensor 200 of FIG. 2 is twice the square root of the number of directional sensors 215 in direction sensor 200.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A direction sensor comprising:
   a plurality of sensor cells,
   wherein each of the sensor cells comprises: a light sensor; and a grating tuned to couple incident light having a first wavelength into the light sensor more strongly when the incident light is incident on the grating at the direction corresponding to the sensor cell than when the incident light is incident on the grating at the different directions corresponding to others of the sensor cells,
   wherein the grating of each sensor cell of the plurality of sensor cells has a grating pattern tuned to a direction of incident light different than a grating pattern of the grating of other sensor cells of the plurality of sensor cells, the grating pattern of each sensor cell being tuned by having a different two-dimensional grating pattern than the grating pattern of each other sensor cell of the plurality of sensor cells.

2. The sensor of claim 1, wherein each of the sensor cells further comprises a waveguide into which the grating directs diffracted light, wherein the grating and the waveguide together act as a guided-mode resonances filter.

3. The sensor of claim 1, wherein the sensor cells are arranged in an array and are parts of an integrated circuit chip.

4. The sensor of claim 1, wherein the plurality of different angles includes angles of rotation about different axes.

5. The sensor of claim 1, wherein in each of the sensor cells, the grating provides a resonant coupling into the light sensor.

6. The sensor of claim 5, wherein respective widths of the resonant coupling of the sensor cells differ.

7. The sensor of claim 1, wherein the gratings of the sensor cells have different one-dimensional patterns.

8. The sensor of claim 1, wherein each of the light sensors in the sensor cells comprises a photodiode.

9. The sensor of claim 1, further comprising a mounting to which the sensor cells are attached, wherein the mounting is capable of tilting the sensor cells as a unit.

10. The sensor of claim 9, wherein the mounting has two rotational degrees of freedom for rotation of the sensor cells.

11. The sensor of claim 1, further comprising a peripheral circuit coupled to receive respective sense signals from the sensor cells, wherein the peripheral circuit generates a measurement signal indicating a measured direction of a beam incident on the sensor cells.

12. The sensor of claim 11, wherein the peripheral circuit determines the measured direction based on which of the sensor cells contains light sensors that detect light corresponding to resonant coupling of the incident light into the sensor cells.

13. The sensor of claim 11, wherein the measured direction is the direction corresponding to one of the sensor cells identified as detecting a highest intensity of light coupled into the sensor cells.

14. The sensor of claim 1, wherein the measurement signal from the peripheral circuits indicates the direction that corresponds to the sensor cell that produced the sense signal that is strongest.

15. The sensor of claim 1, wherein the peripheral circuit uses the sense signals in a process that interpolates between the directions corresponding to the sensor cells to thereby determine the measured direction.

16. A process for measuring beam direction, comprising:
    directing a beam having a first wavelength and having a direction to be measured at a plurality of sensor cells, wherein each of the sensor cells comprises: a light sensor; and a grating that couples incident light from the beam into the light sensor more strongly when the incident light is incident on the grating at the direction corresponding to the sensor cell than when the incident light is incident on the grating at the different directions corresponding to others of the sensor cells, wherein the grating of each sensor cell of the plurality of sensor cells has a grating pattern tuned to a direction of incident light different than a grating pattern of the grating of other sensor cells of the plurality of sensor cells, the grating pattern of each sensor cell being tuned by having a different two-dimensional grating pattern than the grating pattern of each other sensor cell of the plurality of sensor cells;
    identifying one or more of the sensor cells that contain respective light sensors that detect light corresponding to resonant couplings of the incident light into the sensor cells; and
    generating a measured direction for the beam based on the different directions corresponding to one or more sensor cells identified.

17. The process of claim 16, wherein identifying one or more of the sensor cells comprises identifying one of the sensor cells containing a light sensor detecting a highest intensity of light, and the measured direction is the direction corresponding to the sensor cell identified.

* * * * *